US007960455B2

(12) United States Patent
Nied et al.

(10) Patent No.: US 7,960,455 B2
(45) Date of Patent: Jun. 14, 2011

(54) USE OF COPOLYMERS CONTAINING ALKYLENE OXIDE UNITS AS AN ADDITIVE TO AQUEOUS SYSTEMS

(75) Inventors: Stephan Nied, Neustadt / Wstr. (DE); Karl-Heinz Buechner, Altlussheim (DE); Marcus Guzmann, Muehlhausen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 630 days.

(21) Appl. No.: 11/916,819

(22) PCT Filed: Jun. 14, 2006

(86) PCT No.: PCT/EP2006/063234
§ 371 (c)(1),
(2), (4) Date: Dec. 7, 2007

(87) PCT Pub. No.: WO2006/134140
PCT Pub. Date: Dec. 21, 2006

(65) Prior Publication Data
US 2008/0214737 A1   Sep. 4, 2008

(30) Foreign Application Priority Data
Jun. 17, 2005 (DE) .................. 10 2005 028 460

(51) Int. Cl.
| | |
|---|---|
| C08K 5/53 | (2006.01) |
| C08K 5/5317 | (2006.01) |
| C02F 5/08 | (2006.01) |
| C02F 5/10 | (2006.01) |
| C02F 5/12 | (2006.01) |
| C02F 5/14 | (2006.01) |

(52) U.S. Cl. ........ 524/130; 524/123; 524/124; 524/556; 524/558; 252/175; 252/180; 210/696; 210/697; 210/698; 210/699; 210/700; 210/701

(58) Field of Classification Search .................. 526/320; 252/175, 180; 210/696, 697, 698, 699, 700, 210/701; 524/123, 124, 130, 556, 558
See application file for complete search history.

(56) References Cited

U.S. PATENT DOCUMENTS

| | | | | |
|---|---|---|---|---|
| 4,389,324 A | * | 6/1983 | Keller | 252/180 |
| 4,868,287 A | * | 9/1989 | Sikes et al. | 530/324 |
| 5,087,376 A | * | 2/1992 | Bendiksen et al. | 210/700 |
| 6,641,754 B2 | * | 11/2003 | Buentello et al. | 252/180 |
| 7,405,263 B2 | * | 7/2008 | Baum et al. | 526/317.1 |
| 2004/0019148 A1 | | 1/2004 | Suau et al. | |
| 2005/0202994 A1 | * | 9/2005 | Baum et al. | 510/475 |
| 2005/0245427 A1 | | 11/2005 | Baum et al. | |

FOREIGN PATENT DOCUMENTS

| | | |
|---|---|---|
| CA | 2 543 543 | 5/2005 |
| EP | 0 554 074 B1 | 8/1993 |
| EP | 1 158 009 | 11/2001 |
| JP | 56-81 320 | 7/1981 |
| JP | 57-84 794 | 5/1982 |
| JP | 57-185308 | 11/1982 |
| JP | 63-89 687 | 4/1988 |
| JP | 10-57 988 | 3/1989 |
| JP | 2000-24691 | 1/2000 |
| WO | WO 03/104373 A1 | 12/2003 |
| WO | WO 2005/042684 A1 | 5/2005 |

* cited by examiner

*Primary Examiner* — David Wu
*Assistant Examiner* — Vu A Nguyen
(74) *Attorney, Agent, or Firm* — Oblon, Spivak, McClelland, Maier & Neustadt, L.L.P.

(57) ABSTRACT

Use of copolymers comprising alkylene oxide units, which copolymers comprise incorporated randomly or blockwise by polymerization (a) 50 to 93 mol % of acrylic acid and/or a water-soluble salt of acrylic acid, (b) 5 to 30 mol % of methacrylic acid and/or a water-soluble salt of methacrylic acid and (c) 2 to 20 mol % of at least one nonionic monomer of the formula I

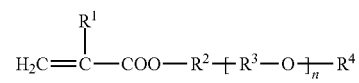

where the variables have the following meaning:
$R^1$ hydrogen or methyl;
$R^2$ a chemical bond or unbranched or branched $C_1$-$C_6$-alkylene;
$R^3$ identical or different unbranched or branched $C_2$-$C_4$-alkylene radicals;
$R^4$ unbranched or branched $C_1$-$C_6$-alkyl;
n 3 to 50, as additive to phosphate- and/or phosphonate-comprising aqueous systems in industrial technical plants.

20 Claims, No Drawings

USE OF COPOLYMERS CONTAINING ALKYLENE OXIDE UNITS AS AN ADDITIVE TO AQUEOUS SYSTEMS

The present invention relates to the use of copolymers comprising alkylene oxide units, which copolymers comprise incorporated randomly or blockwise by polymerization
(a) 50 to 93 mol % of acrylic acid and/or a water-soluble salt of acrylic acid,
(b) 5 to 30 mol % of methacrylic acid and/or a water-soluble salt of methacrylic acid and
(c) 2 to 20 mol % of at least one nonionic monomer of the formula I

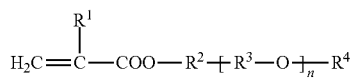

where the variables have the following meaning:
$R^1$ hydrogen or methyl;
$R^2$ a chemical bond or unbranched or branched $C_1$-$C_6$-alkylene;
$R^3$ identical or different unbranched or branched $C_2$-$C_4$-alkylene radicals;
$R^4$ unbranched or branched $C_1$-$C_6$-alkyl;
n 3 to 50,
as additive to phosphate- and/or phosphonate-comprising aqueous systems in industrial technical plants.

In addition, the inventions relate to formulations for water treatment and for corrosion inhibition which comprise these copolymers and polyphosphates and/or phosphonates.

Aqueous systems which are a heat-transferring constituent of industrial technical plants are customarily stabilized by addition of various substances.

For instance, customarily phosphorus-comprising formulations are added to these cooling or heating media to reduce the formation of deposits and corrosion. These are, in particular, linear or ring polyphosphates and phosphonates, such as the sodium salts of 1-hydroxyethane-1,1-diphosphonic acid (HEDP), 2-phosphonobutane-1,2,4-tricarboxylic acid (GBTC) and aminotrimethylenephosphonic acid (ATMP). The polyphosphates and phosphonates keep the hardness-forming calcium and magnesium ions of water in solution and in addition act in a corrosion-inhibiting manner, by forming a thin protective film on the metal surface of the system with the metal ions present in the system, in particular iron(II) and calcium ions. In particular at high water hardness, however, thick calcium phosphonate and phosphate scales and particulate calcium phosphonate and phosphate agglomerates form undesirably, which block the piping system. In addition, in particular due to hydrolysis of the polyphosphates, deposition of calcium phosphate frequently occurs.

To decrease these unwanted side effects and thus to stabilize the polyphosphates and phosphonates, use is made of organic polymers, inter alia including those based on copolymers of alkylene-oxide-comprising monomers. These are in particular copolymers of an unsaturated carboxylic acid, such as acrylic acid, methacrylic acid or maleic acid, with polyalkylene glycol allyl ethers (EP-A-554 074, JP-A-56-81 320, JP-A-57-84 794, JP-A-57-185 308). EP-A-1 158 009 discloses for this purpose copolymers of acrylic acid with low-molecular-weight monomers based on allyl ether.

In JP-A-63-89 687, use is made of copolymers of acrylic acid or methacrylic acid and polyalkylene glycol methacrylates in combination with nitrogen heterocycles as alternative corrosion inhibitors for steel and copper.

Copolymers comprising alkylene oxide are also described as inhibitor, in particular of silicate scales in water circuits. For instance, JP-A-2000-24691 discloses copolymers of unsaturated carboxylic acids and monomers comprising polyalkylene oxide units of mean molecular weights $M_w$ of >50 000 to 3 000 000 for this purpose. Specifically, copolymers of acrylic acid and methoxypolyethylene glycol methacrylate are disclosed. According to JP-A-10-57 988, these can also be copolymers based on acrylic acid or maleic acid and polyalkylene glycol vinyl ethers.

Terpolymers based on acrylic acid, methacrylic acid and polyalkylene glycol methacrylates have previously been described as dispersants and/or grinding aids for mineral pigments in the paper industry (US-A-2004/019148) or incrustation-inhibiting additive to laundry detergents and cleaners (WO-A-03/104373). However, none of these applications is comparable with the present field of application which, over markedly longer periods of time, makes varying requirements on the alkali and temperature stability of the polymer.

Finally, phosphate ions can also be comprised in water itself as natural constituent, which can be the case, in particular in the case of waters from rivers or lakes, and thus can be carried over into aqueous technical systems and lead to unwanted formation of phosphate deposits and scales.

As an example of this, the sugar industry may be mentioned. The water used here for washing the sugar beets frequently comprises phosphate which coprecipitates on evaporation of the aqueous sugar solutions produced (what is termed sugar juice) and must be laboriously separated from the sugar crystals which are likewise precipitated.

The object underlying the invention, therefore, was to provide polymers which can stabilize the phosphate and phosphonate ions in aqueous systems and can inhibit the formation of unwanted slightly soluble phosphate and phosphonate deposits.

Accordingly, the use has been found of copolymers comprising alkylene oxide units, which copolymers comprise incorporated randomly or blockwise by polymerization
(a) 50 to 93 mol % of acrylic acid and/or a water-soluble salt of acrylic acid,
(b) 5 to 30 mol % of methacrylic acid and/or a water-soluble salt of methacrylic acid and
(c) 2 to 20 mol % of at least one nonionic monomer of the formula I

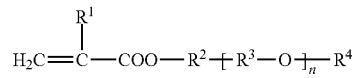

where the variables have the following meaning:
$R^1$ hydrogen or methyl;
$R^2$ a chemical bond or unbranched or branched $C_1$-$C_6$-alkylene;
$R^3$ identical or different unbranched or branched $C_2$-$C_4$-alkylene radicals;
$R^4$ unbranched or branched $C_1$-$C_6$-alkyl;
n 3 to 50,
as additive to phosphate- and/or phosphonate-comprising aqueous systems in industrial technical plants.

In addition, formulations for water treatment and for corrosion protection have been found which comprise these copolymers and polyphosphates and/or phosphonates.

The copolymers which comprise alkylene oxide units and are to be used according to the invention comprise, as components (a) and (b) incorporated by polymerization acrylic acid or methacrylic acid and/or water-soluble salts of these acids, in particular the alkali metal salts, such as potassium, and especially sodium salts, and ammonium salts.

The fraction of acrylic acid (a) of the copolymers to be used according to the invention is 50 to 93 mol %, preferably 65 to 85 mol %, and particularly preferably 65 to 75 mol %.

Methacrylic acid (b) is present in the copolymers to be used inventively at 5 to 30 mol %, preferably at 10 to 25 mol %, and especially at 15 to 25 mol %.

The copolymers comprise, as component (c), nonionic monomers of the formula I

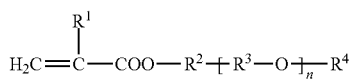

where the variables have the following meaning:
$R^1$ hydrogen or methyl, preferably methyl;
$R^2$ a chemical bond or unbranched or branched $C_1$-$C_6$-alkylene, preferably a chemical bond;
$R^3$ identical or different unbranched or branched $C_2$-$C_4$-alkylene radicals, preferably $C_2$-$C_3$-alkylene radicals, particularly preferably ethylene;
$R^4$ unbranched or branched $C_1$-$C_6$-alkyl, preferably $C_1$-$C_2$-alkyl;
n 3 to 50, preferably 5 to 40, particularly preferably 10 to 30.

Particularly suitable examples for the monomers I which may be mentioned are: methoxypolyethylene glycol(meth)acrylate, methoxypolypropylene glycol(meth)acrylate, methoxypolybutylene glycol(meth)acrylate, methoxypoly(propylene oxide-co-ethylene oxide)(meth)acrylate, ethoxypolyethylene glycol(meth)acrylate, ethoxypolypropylene glycol(meth)acrylate, ethoxypolybutylene glycol(meth)acrylate and ethoxypoly(propylene oxide-co-ethylene oxide)(meth)acrylate, preference being given to methoxypolyethylene glycol(meth)acrylate and methoxypolypropylene glycol(meth)acrylate and particular preference being given to methoxypolyethylene glycol methacrylate.

The polyalkylene glycols comprise 3 to 50, in particular 5 to 40, and especially 10 to 30, alkylene oxide units.

The fraction of the nonionic monomer (c) in the copolymers to be used according to the invention is 2 to 20 mol %, preferably 5 to 15 mol %, and especially 5 to 10 mol %.

The copolymers to be used according to the invention generally have a mean molecular weight $M_w$ from 3 000 to 50 000, preferably from 10 000 to 30 000, and particularly preferably from 15 000 to 25 000.

The K value of the copolymers is customarily 15 to 40, in particular 20 to 35, especially 27 to 30 (measured in 1% strength by weight aqueous solution at 25° C., according to H. Fikentscher, Cellulose-Chemie, Vol. 13, pp. 58-64 and 71-74 (1932)).

The copolymers to be used according to the invention can be produced by free-radical polymerization of the monomers. All known free-radical polymerization methods can be employed. In addition to polymerization without solvent, in particular the methods of solution polymerization and emulsion polymerization may be mentioned, preference being given to solution polymerization.

The polymerization is preferably carried out in water as solvent. However, it can also be performed in alcoholic solvents, in particular $C_1$-$C_4$-alcohols, such as methanol, ethanol and isopropanol, or mixtures of these solvents with water.

Suitable polymerization initiators are compounds not only breaking down thermally, but also photochemically (photoinitiators) and forming free radicals.

Among the thermally activatable polymerization initiators, initiators having a decomposition temperature in the range from 20 to 180° C., in particular from 50 to 90° C., are preferred. Examples of suitable thermal initiators are inorganic peroxo compounds, such as peroxodisulfates (ammonium and preferably sodium peroxodisulfate), peroxosulfates, percarbonates and hydrogen peroxide; organic peroxo compounds, such as diacetyl peroxide, di-tert-butyl peroxide, diamyl peroxide, dioctanoyl peroxide, didecanoyl peroxide, dilauroyl peroxide, dibenzoyl peroxide, bis(o-toloyl)peroxide, succinyl peroxide, tert-butyl peracetate, tert-butyl permaleate, tert-butylperisobutyrate, tert-butyl perpivalate, tert-butyl peroctoate, tert-butyl perneodecanoate, tert-butyl perbenzoate, tert-butyl peroxide, tert-butyl hydroperoxide, cumene hydroperoxide, tert-butyl peroxy-2-ethylhexanoate and diisopropyl peroxydicarbamate; azo compounds, such as 2,2'-azobisisobutyronitrile, 2,2'-azobis(2-methylbutyronitrile) and azobis(2-amidopropane)dihydrochloride.

These initiators can be used in combination with reducing compounds as starter/controller systems. Examples of such reducing compounds which may be mentioned are phosphorus compounds, such as phosphorous acid, hypophosphites and phosphinates, sulfur compounds, such as sodium hydrogensulfite, sodium sulfite and sodium formaldehyde sulfoxylate, and also hydrazine.

Examples of suitable photoinitiators are benzophenone, acetophenone, benzoin ethers, benzyl dialkyl ketones and derivatives thereof.

Preferably, use is made of thermal initiators, preference being given to inorganic peroxo compounds, in particular sodium peroxodisulfate (sodium persulfate). Particularly advantageously, use is made of the peroxo compounds in combination with sulfur-comprising reducing agents, in particular sodium hydrogensulfite, as redox initiator system. When this starter/controller system is used, copolymers are obtained which comprise, as end groups, —$SO_3^-Na^+$ and/or —$SO_4^-Na^+$.

Alternatively, use can also be made of phosphorus-comprising starter/controller systems, e.g. hypophosphites/phosphinates.

The amounts of photoinitiator or starter/controller system are to be matched to the monomers respectively used. If, for example, the preferred system peroxodisulfate/hydrogen sulfite is used, customarily 2 to 6% by weight, preferably 3 to 5% by weight, of peroxodisulfate, and generally 5 to 30% by weight, preferably 5 to 10% by weight, of hydrogen sulfite are used, in each case based on the total amount of the monomers (a), (b) and (c).

If desired, use can also be made of polymerization controllers. Suitable compounds are those known to those skilled in the art, e.g. sulfur compounds, such as mercaptoethanol, 2-ethylhexyl thioglycolate, thioglycolic acid and dodecylmercaptan. When polymerization controllers are used, their amount used is generally 0.1 to 15% by weight, preferably 0.1 to 5% by weight, and particularly preferably 0.1 to 2.5% by weight, in each case based on the total amount of the monomers (a), (b) and (c).

The polymerization temperature is generally 30 to 200° C., preferably 50 to 150° C., and particularly preferably 80 to 120° C.

The polymerization can be carried out under atmospheric pressure, but preferably it is performed in closed system under the inherent pressure which develops.

When the copolymers to be used inventively are produced, the monomers (a), (b) and (c) can be used as such, but use can also be made of reaction mixtures which are formed in the production of the monomers (c). Thus, for example, instead of methoxypolyethylene glycol methacrylate, use can be made of the monomer mixture produced in esterification of polyethylene glycol monomethyl ether having an excess of methacrylic acid. Advantageously, the esterification can also be carried out in situ in the polymerization mixture, by adding together in parallel (1) acrylic acid, (2) a mixture of methacrylic acid and polyethylene glycol monomethyl ether and (3) free-radical starter. If appropriate, a catalyst necessary for the esterification, such as methanesulfonic acid or p-toluenesulfonic acid can additionally be used.

The copolymers to be used inventively can also be produced by polymer-analogous reaction, e.g. by reacting an acrylic acid/methacrylic acid copolymer with polyalkylene glycol monoalkyl ether. However, preference is given to free-radical copolymerization of the monomers.

If desired for the application, the aqueous solutions formed in the production of the carboxyl-comprising copolymers to be used inventively can be neutralized or partially neutralized, i.e. adjusted to a pH in the range of 4-8, preferably 4.5-7.5, by adding base, in particular sodium hydroxide solution.

The copolymers to be used according to the invention are outstandingly suitable as additive to aqueous systems comprising phosphate and/or phosphonate in industrial technical plants.

They are of particular importance as additive to the water circuits used in particular in heat-transfer processes which comprise polyphosphate and phosphonate ions for stabilizing hardness and for corrosion protection.

The copolymers to be used according to the invention stabilize these ions, promote their activity thereby and effectively prevent, even at high water hardnesses and high pHs, the formation of unwanted slightly soluble phosphate and phosphonate scales and deposits.

They can be added to the aqueous systems, e.g. the water circuits, separately, or can be already mixed in advance with the further additives and used, e.g. in the form of, in particular, aqueous formulations which also comprise the polyphosphates and/or phosphonates and also if desired further constituents, such as biocides and surfactants.

As examples of the polyphosphates used in these formulations for water treatment and/or for corrosion protection, which polyphosphates can be linear or ring-shaped, mention may be made of sodium triphosphate and sodium hexametaphosphate.

Examples of suitable phosphonates are, in addition to the salts mentioned at the outset, HEDP, GBTC and ATMP ethylenediaminetetramethylene phosphonate, hexamethylenediaminetetramethylene phosphonate and diethylenetriaminepentamethylene phosphonate.

The copolymers to be used according to the invention, however, are also of particular interest as additive to aqueous systems which in any case comprise phosphate, to which phosphates are therefore not added first, since they also prevent here the formation of slightly soluble phosphate deposits and scales.

As a preferred example of these fields of use, the sugar industry may be mentioned. The copolymers can here effectively prevent the formation of unwanted phosphate deposits in the aqueous sugar solutions provided for evaporation.

EXAMPLES

A) Production of Copolymers Comprising Alkylene Oxide Units
Copolymer I

In a reactor having a nitrogen supply, reflux condenser and metering apparatus, a mixture of 619 g of distilled water and 2.2 g of phosphorous acid was heated to 100° C. internal temperature with nitrogen feed and stirring. Then, in parallel, (1) a mixture of 123.3 g of acrylic acid and 368.5 g of distilled water, (2) a mixture of 72.0 g of distilled water and 216 g of a mixture of methacrylic acid and methoxypolyethylene glycol methacrylate ($M_w$ of the polyethylene glycol: 1 100) in the molar ratio 4:1, (3) 46 g of a 40% strength by weight aqueous sodium hydrogen sulfite solution and (4) a solution of 18.4 g of sodium peroxodisulfate in 164.6 g of distilled water was added continuously in the course of 5 h. After further stirring for two hours under nitrogen at 100° C. and subsequent cooling to room temperature, 190 g of a 50% strength by weight sodium hydroxide solution were added.

This produced a slightly yellowish clear solution of the copolymer I having a solids content of 25.7% by weight and a K value of 27.2 (1% strength by weight aqueous solution, 25° C.).

B) Use for Inhibiting Calcium Phosphate and Calcium Phosphonate in Cooling Water Circuits
B1) Calcium Phosphate Inhibition To investigate the calcium phosphate-inhibiting action of copolymer I, use was made of the following reagents:
Vanadate/Molybdate Reagent for Phosphate Determination (Merck)
Test solution A: 0.42 g of a 5% strength by weight aqueous $H_3PO_4$ solution, made up to 1 l with distilled water
Test solution B: 1.64 g/l of $CaCl_2.6 H_2O$
0.79 g/l of $MgSO_4.7 H_2O$
1.08 g/l of $NaHCO_3$ The following procedure was followed:
100 ml of test solution A were placed in a closable 300 ml beaker made of Lupolen® (BASF), then, first, in each case 2, 4 and 5 ml of a 0.1% strength by weight aqueous solution of the copolymer I, and then 100 ml of test solution B were added.

The respective resultant test solution had the following parameters:
Total hardness: 5.4 mmol/l
Carbonate hardness: 6.42 mmol/l
Phosphate content: 10 ppm
Polymer content: 10, 20 and 25 ppm, respectively The closed beakers were then shaken for 24 h at 70° C. (shaking waterbath 1086, GFL). After cooling to room temperature (approximately 1 h), the sample solutions were filtered off by suction, through a membrane filter of pore width 0.45 μm.

To determine the residual amount of phosphate, 50 ml of the filtrate were admixed with 10 ml of the vanadate/molybdate reagent. After 10 min, the phosphate content was determined photometrically (Dr. Lange Photometer, type LP2W) via the intensity of the yellow coloration, with reference to a calibration curve.

In Table 1, the inhibition achieved in each case is reported in %. At a degree of inhibition of 100%, no calcium phosphate precipitate forms, at degrees of inhibition <100%, the phosphate content of the sample solution has been correspondingly reduced by formation of calcium phosphate.

TABLE 1

| | Concentration of the copolymer I in the sample solution | | |
|---|---|---|---|
| | 10 ppm | 20 ppm | 25 ppm |
| Phosphate inhibition | 97% | 100% | 100% |

B2) Calcium Phosphonate Inhibition
To investigate the calcium phosphonate-inhibiting action of copolymer I, use was made of the following reagents:

Dr. Lange Test Kit LCK 350

Test solution A: 2.2 g of a 1% strength by weight solution of HEDP (Dequest®,900 2010, Solutia), made up to 1 l with distilled water Test solution B: 1.64 g/l CaCl$_2$.6 H$_2$O
0.79 g/l MgSO$_4$.7 H$_2$O
1.08 g/l NaHCO$_3$ The following procedure was followed:

100 ml of test solution A were placed in a closable 300 ml beaker made of Lupolen® (BASF), then, first, in each case 2, 4 and 5 ml of a 0.1% strength by weight aqueous solution of the copolymer I, and then 100 ml of test solution B were added.

The respective resultant test solution had the following parameters:
Total hardness: 5.4 mmol/l
Carbonate hardness: 6.42 mmol/l
Phosphonate content, calculated as phosphate: 10 ppm
Polymer content: 10, 20 and 25 ppm, respectively The closed beakers were then shaken for 24 h at 70° C. (shaking waterbath 1086, GFL). After cooling to room temperature (approximately 1 h), the sample solutions were filtered off by suction through a membrane filter of pore width 0.45 μm.

The residual amount of phosphonate in the filtrate was determined photometrically using the Dr. Lange test kit LCK 350.

In Table 2, the inhibition achieved in each case is reported in %. At a degree of inhibition of 100%, no calcium phosphonate precipitate forms, at degrees of inhibition <100%, the phosphonate content of the sample solution has been correspondingly reduced by formation of calcium phosphonate.

TABLE 2

|  | Concentration of the copolymer I in the sample solution | | |
| --- | --- | --- | --- |
|  | 10 ppm | 20 ppm | 25 ppm |
| Phosphonate inhibition | 100% | 100% | 100% |

The invention claimed is:

1. A composition comprising:
    (1) a copolymer comprising alkylene oxide repeat units, wherein the copolymer comprises incorporated randomly or blockwise by polymerization:
        (a) 50-93 mol % of acrylic acid and/or a water-soluble salt of acrylic acid;
        (b) 5-30 mol % of methacrylic acid and/or a water-soluble salt of methacrylic acid; and
        (c) 2-20 mol % of at least one nonionic monomer of the formula I:

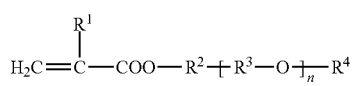

wherein
   $R^1$ is hydrogen or methyl,
   $R^2$ is a chemical bond or an unbranched or branched $C_1$-$C_6$-alkylene,
   $R^3$ is an identical or different, unbranched or branched $C_2$-$C_4$-alkylene,
   $R^4$ is an unbranched or branched $C_1$-$C_6$-alkyl, and
   n an integer of 3-50; and
    (2) one or more phosphonates selected from the group consisting of 1-hydroxyethane- 1,1-diphosphonic acid, 2-phosphonobutane-1,2,4-tri-carboxylic acid, aminotrimethylenephosphonic acid, ethylenediaminetetramethylene phosphonate, hexamethylenediaminetetramethylene phosphonate and diethylenetriaminepentamethylene phosphonate.

2. The composition according to claim 1, wherein the copolymer comprises incorporated randomly or blockwise by polymerization: 65-85 mol % of component (a); 10-25 mol % of component (b); and 5-15 mol % of component (c).

3. The composition according to claim 1, wherein the copolymer comprises incorporated randomly or blockwise by polymerization: 65-75 mol % of component (a); 15-25 mol % of component (b); and 5-10 mol % of component (c).

4. The composition according to claim 1, wherein $R^1$ is methyl, $R^2$ is a chemical bond, $R^3$ is a $C_2$-$C_3$-alkylene, $R^4$ is $C_1$-$C_2$-alkyl, and n is an integer of 5-40.

5. The composition according to claim 1, wherein $R^1$ is methyl, $R^2$ is a chemical bond, $R^3$ is ethylene, $R^4$ is methyl, and n is an integer of 10-30.

6. The composition according to claim 1, wherein the phosphonate is 1- hydroxyethane-1,1-diphosphonic acid.

7. The composition according to claim 1, wherein the phosphonate is 2- phosphonobutane-1,2,4-tri-carboxylic acid.

8. The composition according to claim 1, wherein the phosphonate is aminotrimethylenephosphonic acid.

9. The composition according to claim 1, wherein the phosphonate is ethylenediaminetetramethylene phosphonate.

10. The composition according to claim 1, wherein the phosphonate is hexamethylenediaminetetramethylene phosphonate.

11. The composition according to claim 1, wherein the phosphonate is diethylenetriaminepentamethylene phosphonate.

12. The composition according to claim 1, wherein the composition further comprises one or more ingredients selected from the group consisting of a biocide, a surfactant, a phosphate and water.

13. The composition according to claim 1, wherein the composition further comprises a phosphate.

14. The composition according to claim 13, wherein the phosphate is one or more polyphosphates selected from the group consisting of sodium triphosphate and sodium hexametaphosphate.

15. A method of treating an aqueous system comprising adding the composition of claim 1 to the aqueous system.

16. The method according to claim 15, which inhibits corrosion of a metal surface in the aqueous system.

17. The method according to claim 15, which inhibits the formation of phosphonate scales and deposits in the aqueous system.

18. The method according to claim 15, wherein the aqueous system is an agricultural aqueous system comprising an aqueous sugar solution or an aqueous sugar beet solution.

19. The method according to claim 15, wherein the aqueous system is an industrial aqueous system comprising a water circuit.

20. The method according to claim 19, wherein the water circuit comprises water which is circulated and/or subjected to a heat-transfer process.

* * * * *